United States Patent
Cox

[15] 3,647,256
[45] Mar. 7, 1972

[54] WINDSHIELD AIR DEFLECTOR

[72] Inventor: Ernest P. Cox, Seeley Lake, Mont. 59868
[22] Filed: May 12, 1970
[21] Appl. No.: 36,590

[52] U.S. Cl. ................................................. 296/91
[51] Int. Cl. ............................................... B60j 1/20
[58] Field of Search .............................. 296/1 S, 91

[56] References Cited

UNITED STATES PATENTS

| | | | |
|---|---|---|---|
| 2,963,315 | 12/1960 | Wilsdorf | 296/91 |
| 3,214,215 | 10/1965 | Hansen | 296/91 |
| 2,223,378 | 12/1940 | Martin | 296/91 |
| 2,644,716 | 7/1953 | McVicker | 296/91 |
| 2,816,796 | 12/1957 | Saucerman | 296/91 |

FOREIGN PATENTS OR APPLICATIONS 647,967   8/1964   Belgium .................................. 296/91

*Primary Examiner*—Benjamin Hersh
*Assistant Examiner*—Leslie J. Paperner
*Attorney*—Dwight N. Mason

[57] ABSTRACT

A unitary shallow airscoop attaches externally to the automobile hood and covers substantially the area of the hood and spans the width of the windshield. The airscoop is slightly tapered rearwardly to produce a nozzle effect and a deflector extension directs the airblast upwardly across the windshield to clear the same and to carry debris, insects and the like over the roof of the car. The device is formed of tough heat-resistant plastic and attaches to the hood in a safe manner without marring the automobile in any way.

3 Claims, 4 Drawing Figures

PATENTED MAR 7 1972
3,647,256
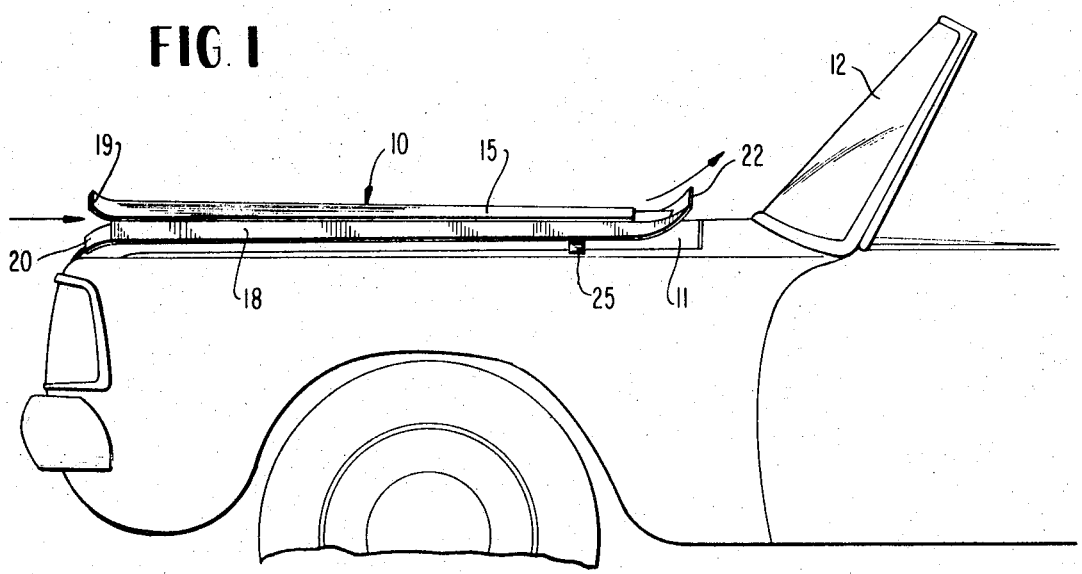
FIG. 1
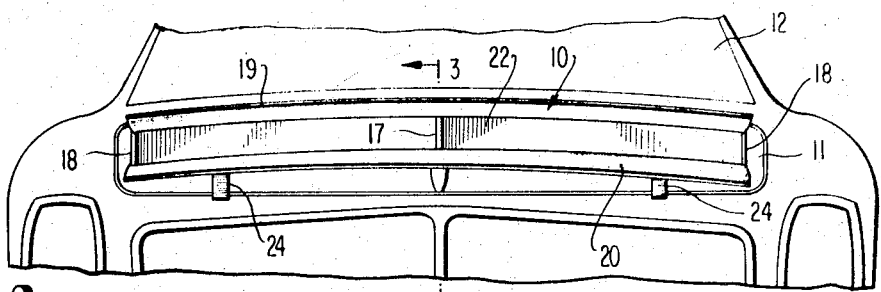
FIG. 2
FIG. 3
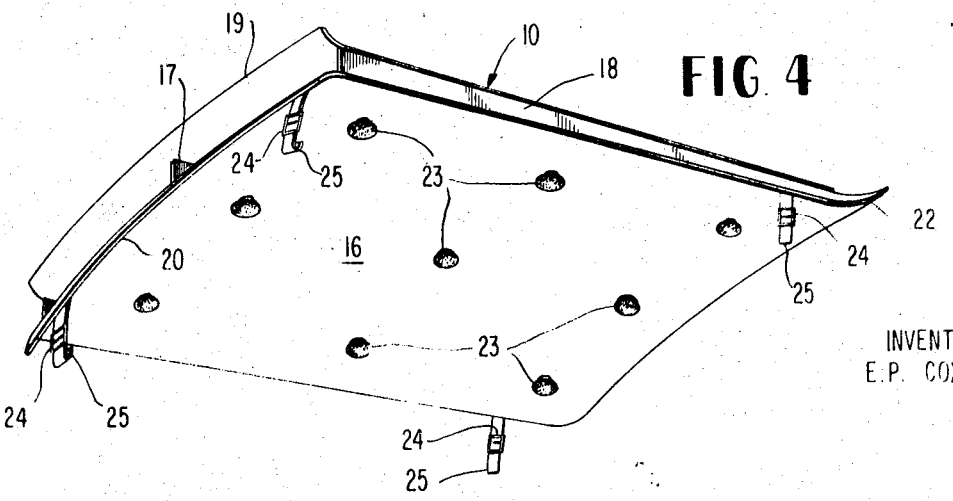
FIG. 4
INVENTOR
E.P. COX

WINDSHIELD AIR DEFLECTOR

Various air deflectors and airscoops are known in the prior art to alleviate the annoying problem caused by insects impacting on windshields at high speeds and for clearing the windshields of other forms of debris. Some examples of the prior art are contained in U.S. Pat. Nos. 2,223,378; 2,816,796 and 3,214,215. In general, these prior art devices have not been widely accepted by the public for several reasons. In some cases, the scoops or deflectors are located too far away from the windshield to be effective, or are too small or do not produce an efficient nozzle effect. Also, the airblast directed toward the windshield is too localized and does not span a sufficient width of the windshield. In other cases, the structures are awkward and unsightly and produce noise and increased wind resistance and detract from the general appearance of the automobile. In still other cases, the airscoop structure is mounted under the hood of the automobile requiring substantial vehicle modification and relying on air entering indirectly through the radiator grill which renders the airscoop inefficient in operation.

Accordingly, it is the object of this invention to provide a simplified and economical attachment-type airscoop and deflector unit which will fit substantially all makes of cars and attach safely to the top of the hood without detracting materially from the appearance of the car. The airscoop has a low silhouette and covers substantially the entire hood and is shaped to blend smoothly into the surrounding automobile body contour without detracting from appearance. The airscoop attaches to the hood preferably with suction cups and has additional safety straps which engage the edges of the hood without marring the same. No structural changes whatsoever in the automobile are required in order to adapt the invention thereto.

The airscoop defines a wide and shallow elongated nozzle passage or slot which extends from the front of the hood back to a point approximately 18 inches from the windshield. The air being rammed through the airscoop has its pressure reduced and its velocity greatly increased as it passes through the restricted rear discharge opening of the scoop, where the air is deflected upwardly and generally parallel to the slope of the windshield. The windshield is bathed with air for substantially its full width and insects and debris caught in this upward airstream are propelled over the top of the car and cannot impact against the windshield. Other features and advantages of the invention will appear during the course of the following description.

BRIEF DESCRIPTION OF DRAWING FIGURES

FIG. 1 is a side elevation of an airscoop or nozzle embodying the invention attached to the hood of an automobile.

FIG. 2 is a front end elevation of the invention.

FIG. 3 is a central vertical longitudinal section taken on line 3—3 of FIG. 2.

FIG. 4 is a perspective view of the invention.

DETAILED DESCRIPTION

Referring to the drawings in detail where like numerals designate like parts, the numeral 10 designates an airscoop or nozzle in its entirety preferably formed of a tough heat-resistant plastic, or some other suitable material. As shown, the airscoop 10 is unitary and is broad and shallow, having a very low silhouette when placed on top of the hood 11 of an automobile having the usual sloping windshield 12. As shown, the airscoop 10 is generally rectangular in its overall configuration and is adapted to span substantially the width and length of the hood 11 and consequently the major width of the windshield 12.

The airscoop 10 forms a broad shallow elongated ram-type nozzle having its forward inlet or mouth 13 wider than its rear end discharge opening 14, FIG. 3. This tapering is caused by having the top wall 15 of the airscoop converge slightly rearwardly with the bottom wall 16 thereof. A vertical divider web 17 is preferably provided in the nozzle passage centrally for added strength but does not impede the flow of air through the unobstructed wide nozzle passage between the walls 15 and 16. The airscoop also has vertical sidewalls 18, as shown.

The forward mouth of the airscoop 10 is flared by the provision of short upwardly and downwardly curved lips 19 and 20, the lower lip 20 blending smoothly into the curvature at the front of the hood shown at 21. Both lips 19 and 20 extend for the full width of the scoop and the entire scoop is transversely curved slightly, FIG. 2, to follow the curvature of the automobile hood. At its rear end, the airscoop has an upwardly curved air deflector plate extension 22 thereon formed as an extension of the bottom wall 16 and also spanning the entire width of the scoop. This element deflects the high-velocity air discharging from the rear end of the scoop nozzle passage upwardly across the windshield 12 to clear the same. The air is discharged from the scoop preferably about 18 inches forwardly of the windshield 12.

The unitary airscoop is secured to the top of the automobile hood 11 preferably by a plurality of suction cups 23 distributed over the bottom thereof as shown in FIG. 4. Additional adjustable safety straps 24 with hooks 25 are provided near the corners of the airscoop 10 to engage the front and side edges of the hood 11. The entire bottom surface of the scoop 10 as well as the hooks 25 may be lined with felt or similar soft material, if desired, for further protection of the automobile. The device will not mar or damage the automobile and its use requires no structural modification thereof. The lower lip 20 prevents air from entering under the scoop between the hood 11 and the lower wall 16. There is only a very narrow space between the hood and the shallow scoop as shown in FIG. 3.

As the automobile travels forwardly at relatively high speeds, air is rammed into the forward relatively wide mouth 13 of the airscoop and travels rearwardly having its pressure reduced and its velocity increased in accordance with well-known principles. The high-velocity airstream exits through the rear wide discharge slot 14 and impinges on the curved deflector 22 which deflects the airstream upwardly and across the windshield 12 to clear the same.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. An airscoop and deflector for automobiles to clear the windshields thereof of insects and debris comprising a unitary shallow airscoop body portion mountable upon the top of an automobile hood and extending over a major portion of the area of the hood and spanning substantially the width of the windshield, said shallow airscoop body portion having a wide shallow substantially unobstructed nozzle passage formed therethrough, said passage becoming progressively vertically narrower toward its rear discharge end, an upwardly curved air deflector adjacent said rear discharge end of the nozzle passage formed as an integral extension on the bottom wall of the airscoop body portion and serving to direct a high-velocity stream of air upwardly across the windshield and over substantially the entire width of the windshield, top and bottom divergent curved lip extensions on the top and bottom walls of the airscoop body portion at the forward mouth thereof, said lip extensions extending for substantially the entire width of said body portion, the bottom lip extension blending smoothly into the curvature of the forward end of the hood and preventing the passage of air into the space between the body portion and hood, and means for securing the air scoop body portion to said hood.

2. The structure as defined in claim 1, and at least one narrow vertical divider web in said nozzle passage extending longitudinally therein and interconnecting the top and bottom walls of the airscoop body portion.

3. The structure as defined in claim 1, and the airscoop body portion including said lip extensions being transversely curved to follow the transverse curvature of the automobile hood.

* * * * *